United States Patent [19]
Ben Dror et al.

[11] Patent Number: 6,091,511
[45] Date of Patent: Jul. 18, 2000

[54] IMAGES WITH SPATIALLY VARYING SPATIAL AND GRAY LEVEL RESOLUTION

[75] Inventors: Yoav Ben Dror, Behovot; Yehuda Niv, Nes Ziona, both of Israel

[73] Assignee: Indigo N.V., Maastricht, Netherlands

[21] Appl. No.: 08/875,608

[22] PCT Filed: Jun. 6, 1995

[86] PCT No.: PCT/NL95/00200

§ 371 Date: Aug. 29, 1997

§ 102(e) Date: Aug. 29, 1997

[87] PCT Pub. No.: WO96/24910

PCT Pub. Date: Aug. 15, 1997

[30] Foreign Application Priority Data

Feb. 6, 1995 [IL] Israel ......................................... 112561

[51] Int. Cl.[7] .......................... H04N 1/405; H04N 1/409; G06T 5/00
[52] U.S. Cl. ........................... 358/1.9; 358/458; 382/266; 382/274
[58] Field of Search ..................................... 382/237, 254, 382/176, 270, 272, 274, 266; 358/455, 456, 457, 458, 462, 466, 1.9, 298

[56] References Cited

U.S. PATENT DOCUMENTS

| | | |
|---|---|---|
| 4,084,183 | 4/1978 | Keller et al. . |
| 4,499,489 | 2/1985 | Gall et al. . |
| 4,547,811 | 10/1985 | Ochi et al. ............................... 358/455 |
| 4,554,593 | 11/1985 | Fox et al. . |
| 4,782,399 | 11/1988 | Sato . |
| 4,837,846 | 6/1989 | Oyabu et al. ........................... 382/272 |
| 5,031,034 | 7/1991 | Shimizu et al. . |
| 5,729,632 | 3/1998 | Tai ......................................... 382/237 |

FOREIGN PATENT DOCUMENTS

| | | |
|---|---|---|
| 0100811 | 2/1984 | European Pat. Off. . |
| 0348145 | 12/1989 | European Pat. Off. . |

OTHER PUBLICATIONS

Carlsohn, M..F. "Proceedings From The SPIE. Conf: Advances In Image Processing", vol. 804, pp. 344–355. Mar. 31, 1987, The Hague," Adaptive Selection of Block Aperture in Transform Coding of Images.".

Peleg, S. IEEE Transactions on Patten Analysis and Machine Intelligence, "A Unified Approach to the Change of Resolution: Space and Gray–Level.", vol. 11, No. 7, pp. 739–742, Jul. 1989.

*Primary Examiner*—Scott Rogers
*Attorney, Agent, or Firm*—Greenblum & Bernstein, P.L.C.

[57] ABSTRACT

An image processing method comprising: providing a digital, continuous-tone, input image represented by an array of pixels, the array having a predetermined pixel resolution and each pixel having a gray level; dividing the array of pixels into a plurality of sub-arrays of pixels; determining a gray level contrast for each of the sub-arrays; if the gray level contrast of a given sub-array exceeds a preselected threshold, generating a high resolution, narrow gray level range, sub-array corresponding to the given sub-array; and if the gray level contrast of the given sub-array is below the preselected threshold, generating a low resolution, wide gray level range, sub-array corresponding to the given sub-array.

52 Claims, 2 Drawing Sheets

IMAGES WITH SPATIALLY VARYING SPATIAL AND GRAY LEVEL RESOLUTION

FIELD OF THE INVENTION

The present invention relates to digital image processing in general and, more particularly, to enhancement of image resolution and contrast.

BACKGROUND OF THE INVENTION

An image to be printed or displayed is generally represented by an array of pixel elements, sometimes referred to as a bit-mapped array, which function as an array of control codes which control the operation of printing-elements or display-elements which, in turn, produce the printed or displayed image. The bit-mapped array is generally constructed based on an input, continuous tone, image using a halftoning process which may incorporate hardware or software or a combination of both. Each pixel element in the bit-mapped array is represented by data bits which define attributes of the printed or displayed pixel, such as pixel color and gray level. A monochrome image is generally defined by a single array of pixel elements, wherein the data bits of each pixel element represent the gray level of the printed or displayed pixel. A color image is generally defined by a plurality of arrays of pixels, wherein each array corresponds to a base-color, such as cyan, magenta, yellow and black.

Halftoning methods and apparatus are described, for example in U.S. Pat. No. 4,499,489, to Gall et al., and in U.S. Pat. No. 4,084,183, to Keller et al.

The resolution of an image is generally determined by the density of pixels used to represent the image. The range of available gray levels per pixel is generally determined by the number of data bits used for representing each pixel. For example, a system using 8 bits per pixel yields a range of 256 gray levels per pixel, in monochrome printing, or 64 gray levels per pixel in 4-color printing.

Due to limitations in processing speed and data storage capacity, the resolution and gray level separation capability of existing imaging systems is limited, particularly when images are processed "on the fly" in high speed printing systems. Therefore, in existing systems, image resolution must often be compromised in order to obtain a wider gray level range or vice versa.

SUMMARY OF THE INVENTION

The present invention seeks to provide a system and a method for enhancing both the resolution and the gray level range of a digitally reproduced image without increasing the amount of digital information required to define the image.

According to the present invention, a detection circuit or algorithm is applied to an input, continuous tone (CT), digital image which is to be printed, displayed or otherwise reproduced. The detection circuit or algorithm is utilized to distinguish between portions of the CT image to be reproduced at a high resolution but with a narrow gray-level range and portions of the CT image to be reproduced at a low resolution but with a wide gray-level range. The high-resolution, narrow gray level, portions are preferably represented by a relatively high pixel density, for example 800 dots per inch (DPI), but each pixel has a relatively narrow range of gray levels, for example one bit per pixel. The low resolution, wide gray level, portions are preferably represented by a lower pixel density, for example 200 DPI, but each pixel has a wider range of gray levels, for example 7 bits per pixel.

In a preferred embodiment of the invention, the detection circuit or algorithm includes edge detection circuitry or an edge-detection algorithm which analyzes sub-arrays of the digital image, for example 4 pixel by 4 pixel sub-arrays of the digital image. An "edge" sub-array is detected when the gray level contrast within the analyzed sub-array exceeds a predetermined threshold. A "non-edge" sub-array is detected when the gray level contrast within the analyzed sub-array is below the predetermined threshold. The gray level contrast may be defined, for example, as the difference or the ratio or any other suitable relation between the highest gray level and the lowest gray level within the analyzed sub-array. Subsequently, the "edge" sub-arrays are represented using the high resolution, low-gray level, representation and the "non-edge" sub-arrays are represented using the low resolution, high gray level, representation. This yields a compressed digital image having a reduced total amount of digital data, wherein a high resolution is maintained in the "edge" portions where the gray level range can generally be compromised, and herein a wide gray level range is maintained in the "non-edge" portions where image resolution can generally be compromised.

There is thus provided, in accordance with a preferred embodiment of the present invention, an image processing method including:

providing a digital, continuous-tone, input image represented by an array of pixels, the array having a predetermined pixel resolution and each pixel having a gray level;

dividing the array of pixels into a plurality of sub-arrays of pixels;

determining a gray level contrast for each of the sub-arrays;

if the gray level contrast of a given sub-array exceeds a preselected threshold, generating a high resolution, narrow gray level range, sub-array corresponding to the given sub-array; and if the gray level contrast of the given sub-array is below the preselected threshold, generating a low resolution, wide gray level range, sub-array corresponding to the given sub-array.

In a preferred embodiment of the present invention, providing the digital input image includes converting a given, unsuitable, pixel resolution into the predetermined pixel resolution.

In a preferred embodiment of the invention, determining the gray level contrast includes determining the difference between the gray level of the highest gray level pixel and the gray level of the lowest gray level pixel. Alternatively, in a preferred embodiment, determining the gray level contrast includes determining the ratio between the gray level of the highest gray level pixel and the gray level of the lowest gray level pixel.

In a preferred embodiment of the invention, the number of bits used for representing the gray level of each pixel in each high resolution sub-array is smaller than the number of bits used for representing the gray level of each pixel of the input image. Preferably, the gray level of each pixel in each high resolution sub-array is represented by one bit. In this preferred embodiment of the invention, generating the high resolution sub-array preferably includes comparing the given sub-array to a predetermined threshold matrix, including a threshold element for each pixel in the given sub-array, and assigning a first gray level to each pixel having a gray level lower than that of the corresponding threshold element and a second gray level to each pixel having a gray level higher than that of the corresponding threshold element.

Additionally or alternatively, in a preferred embodiment of the invention, one gray level is assigned to each low resolution sub-array. According to this embodiment of the invention, the gray level of each low resolution sub-array is represented by more than one bit, preferably by seven bits.

In accordance with a preferred embodiment of the invention, the method further includes combining the high resolution and low resolution sub-arrays to form a compressed, resolution and gray level range enhanced, digital image.

Additionally, in accordance with a preferred embodiment, the method includes decompressing the compressed, resolution and gray level range enhanced, digital image to a form suitable for image reproduction. The decompressed image is then printed, displayed or otherwise reproduced. Preferably, decompression is performed "on the fly".

BRIEF DESCRIPTION OF THE DRAWINGS

The present invention will be better understood from the following detailed description of preferred embodiments of the invention, taken in conjunction with the following drawings in which.

DETAILED DESCRIPTION OF A PREFERRED EMBODIMENT

Figure 1:
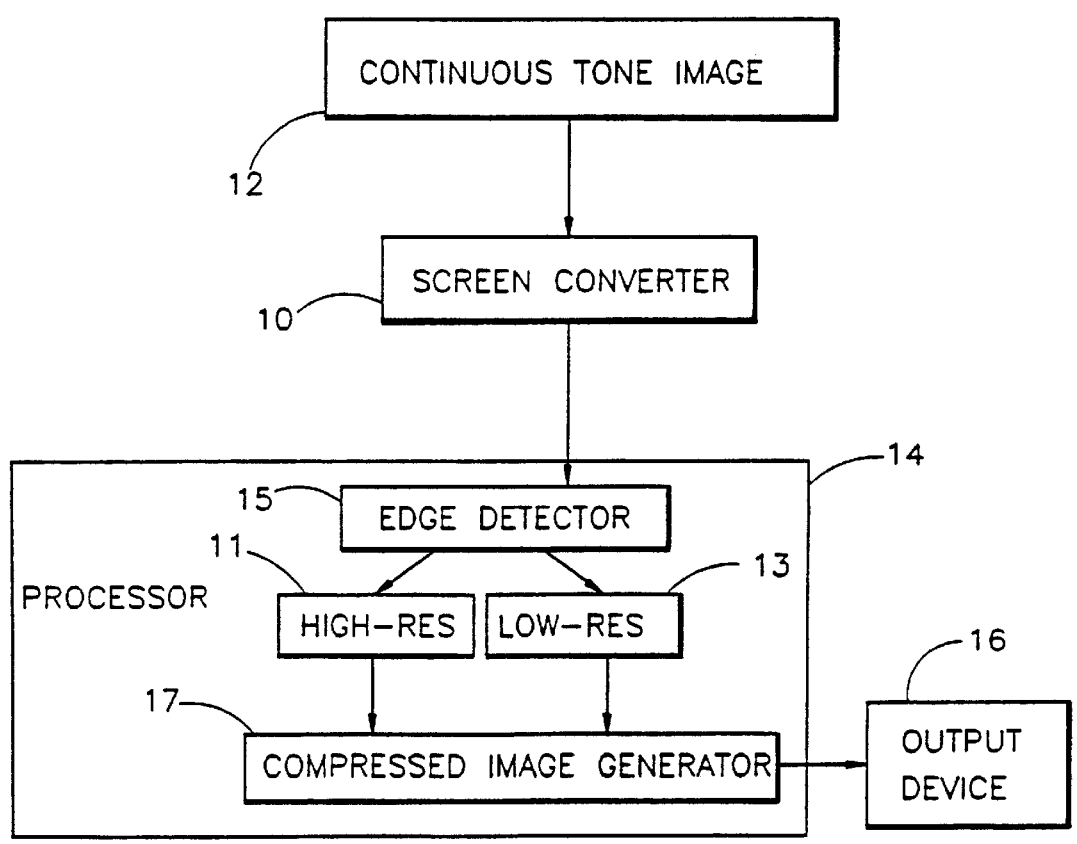
FIG. 1 is a block diagram schematically illustrating a system for enhancing the resolution and the gray level range of a digital image to be reproduced, constructed and operative in accordance with a preferred embodiment of the present invention.

Reference is now made to FIG. 1, which schematically illustrates a system for enhancing the resolution and the gray level range of a digital image to be reproduced, constructed in accordance with a preferred embodiment of the present invention. The system preferably includes a screen converter 10 which receives a continuous tone (CT) image 12, represented by an array of pixels having a given pixel resolution, and generates a corresponding CT image having a pixel resolution adapted for the imaging system to be subsequently used. For color imaging, the CT image includes a plurality of pixel arrays, one for each base color, for example cyan, magenta, yellow and black. As known in the art, each pixel in the CT array is represented by a bit-string which defines the gray level of the pixel. For example, if each pixel is represented by an eight bit string, there are 256 different gray levels.

The CT image is preferably stored in a memory of an image processor 14, which preferably includes edge detection circuitry and/or software 15, a high resolution image generator 11, a low resolution image generator 13 and a compressed image generator 17, as described in more detail below. In a preferred embodiment of the present invention, processor 14 produces a digital output representing a resolution and/or gray level enhanced, compressed, image suitable for subsequent reproduction by an output device 16, which may include a printer, preferably a laser printer or an ink-jet printer, a display device or any other image reproduction device. As described below, the selective image enhancement of the present invention economizes on the amount of digital data representing the image and, thus, enables "on-the-fly" processing of the images when printing in large runs.

Figure 2:
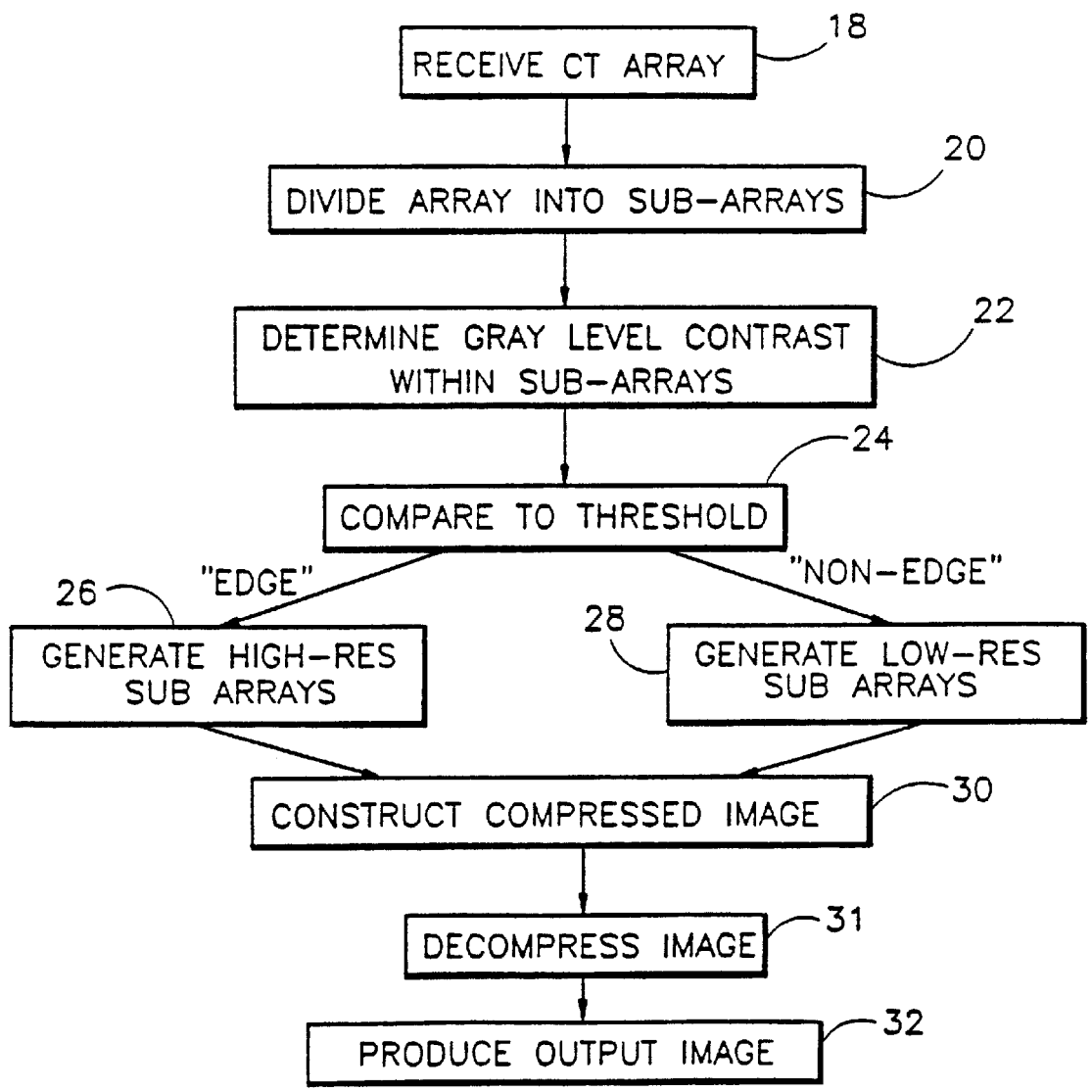
FIG. 2 is a flow chart schematically illustrating a method of resolution and gray level enhancement in accordance with a preferred embodiment of the present invention.

Reference is now made also to FIG. 2 which is a schematic flow chart illustrating a method for resolution and gray level enhancement in accordance with the present invention. The method of FIG. 2 may be implemented using hardware or software in processor 14 or a combination of both. According to the present invention, the bit-mapped array received by processor 14, as indicated at block 18, is divided into a plurality of sub-arrays, for example 4×4, i.e. 16 pixel, arrays, as indicated at block 20. Then, edge detection circuitry or software 15 in processor 14 determines the gray level contrast of each of the plurality of sub-arrays, for example by determining the difference or the ratio between the highest gray level and the lowest gray level within each sub-array, as indicated at block 22. Then, for each of the sub-arrays, the gray level contrast is compared to a preselected threshold contrast, as indicated at block 24.

If the gray level contrast of a given sub-array is above the preselected threshold, a corresponding high resolution sub-array is generated, preferably by a high resolution image generator 11, as indicated at block 26. If the gray level contrast of the given sub-array is below the preselected threshold, a corresponding wide gray level sub-array is generated, preferably by a low resolution image generator 13, as indicated at block 28.

The criterion described above for generating the high resolution sub-arrays is effective because a high gray level contrast generally indicates an "edge", i.e. a relatively sharp change in gray level within the sub-array. It should be appreciated that at the "edge" portions of the image the imaging resolution is more important than the gray level range.

Similarly, the criterion described above for generating the low resolution, wide gray level range, sub-array is effective because a low gray level contrast generally indicates a "non-edge", i.e. a gradual change in gray level within the sub-array. It should be appreciated that at the "non-edge" portions of the image the range of available gray levels is more important than image resolution.

In a preferred embodiment of the present invention, the number of pixels in each processed "edge" sub-array is equal to the number of pixels in the corresponding unprocessed "edge" sub-array, e.g. 16 pixels. However, to reduce the total number of bits in the processed image, the gray level of each pixel in the "edge" sub-arrays is preferably represented by a small number of bits, preferably by a one-bit-string. Generating the high resolution sub-array may include, for example, comparing the unprocessed sub-array to a predetermined threshold matrix, including a threshold element for each pixel in the unprocessed sub-array, and assigning a first gray level to each pixel having a gray level lower than that of the corresponding threshold element and a second gray level to each pixel having a gray level higher than that of the corresponding threshold element. Thus, a high resolution is maintained at the "edge" portions of the image. The use of such a threshold matrix, for halftoning, is described in U.S. Pat. No. 4,499,489, to Gall et al., which is incorporated herein by reference.

Further, in a preferred embodiment of the present invention, a single gray level is assigned to each "non-edge" sub-array, such that the resultant low-resolution sub-array functions as a single, coarse, pixel. The gray level assigned to a given "non-edge" sub-array may be, for example, the average gray level within the given sub-array. However, in contrast to the gray levels of the "edge" sub-arrays, the gray level of the "non-edge" sub-arrays are represented by relatively long bit-strings, preferably by seven-bit strings. Thus, a wide gray level range is available at the "non-edge" portions of the image.

The high resolution and low resolution sub-arrays generated by generators 11 and 13, respectively, are preferably combined by a compressed image generator 17, as indicated at block 30, to form a compressed digital image including high resolution portions and low resolution portions as described above.

Finally, as indicated at blocks 31 and 32, the compressed image is decompressed and reproduced, e.g. printed or displayed, by output device 16. In a preferred embodiment of the invention, the digital data in the compressed image is processed "on-the-fly" by output device 16, which may be high speed printer.

While "edge" sub-arrays are preferably already in bitmap form, since each "edge" pixel is preferably represented by a single bit, "non-edge" sub-arrays require bit-mapping before they can be reproduced. Thus, "edge" and "non-edge" portions of the image require different reproduction, e.g. printing or displaying, modes. To enable correct interpretation of the compressed image during decompression 31, reproduction-mode-control bit strings are preferably introduced to the compressed image during compression 30. For example, a bit-string representing switching from low-resolution to high resolution reproduction, or vice versa, may be provided at the appropriate image locations, i.e. between "edge" and "non edge" portions of the compressed image.

It will be appreciated by persons skilled in the art that the present invention is not limited by the description and example provided hereinabove. Rather, the scope of this invention is defined only by the claims which follow:

What is claimed is:

1. An image processing method comprising:
   providing a digital, continuous-tone, input image represented by an array of pixel, the array having a predetermined pixel resolution and each pixel of said array having one of a predetermined number of available gray levels;
   dividing the array of pixels into a plurality of sub-arrays of pixels;
   determining, within each sub-array, a gray level contrast for each of the sub-arrays;
   if the gray level contrast of a given sub-array exceeds a preselected threshold, generating a high spatial resolution output image sub-array of pixels corresponding to the given sub-array, each of said pixels having one of a first number of gray levels, said first number being smaller than the predetermined number of gray levels of the input image;
   if the gray level contrast of the given sub-array is below the preselected threshold, generating a low spatial resolution output image subarray of pixels corresponding to the given subarray, each of said pixels having a second number of gray levels; said low spatial resolution being smaller than the predetermined pixel resolution of the input image;
   and forming a half tone version of at least the low spatial resolution sub-arrays.

2. A method according to claim 1 wherein providing the digital input image comprises converting a given, unsuitable, pixel resolution into the predetermined pixel resolution.

3. A method according to claim 2 wherein determining the gray level contrast within each sub-array comprises determining the difference between the gray level of the highest gray level pixel. and the gray level of the lowest gray level pixel.

4. A method according to claim 3 wherein the number of bits used for representing the gray level of each pixel in each high spatial resolution sub-array is smaller than the number of bits used for representing the gray level of each pixel of the input image.

5. A method according to claim 2 wherein determining the gray level contrast within each sub-array comprises determining the ratio between the gray level of the highest gray level pixel and the gray level of the lowest gray level pixel.

6. A method according to claim 5 wherein the number of bits used for representing the gray level of each pixel in each high spatial resolution sub-array is smaller than the number of bits used for representing the gray level of each pixel of the input image.

7. A method according to claim 2 wherein the number of bits used for representing the gray level of each pixel in each high spatial resolution sub-array is smaller than the number of bits used for representing the gray level of each pixel of the input image.

8. A method according to claim 2 wherein the gray level of each pixel in each high spatial resolution sub-array is represented by one bit.

9. A method according to claim 2 wherein one gray level is assigned to each low spatial resolution sub-array.

10. A method according to claim 1 wherein determining the gray level contrast within each sub-array comprises determining the difference between the gray level of the highest gray level pixel and the gray level of the lowest gray level pixel.

11. A method according to claim 10 wherein the number of bits used for representing the gray level of each pixel in each high spatial resolution sub-array is smaller than the number of bits used for representing the gray level of each pixel of the input image.

12. A method according to claim 3 wherein the gray level of each pixel in each high spatial resolution sub-array is represented by one bit.

13. A method according to claim 10 wherein one gray level is assigned to each low spatial resolution sub-array.

14. A method according to claim 1 wherein determining the gray level contrast within each sub-array comprises determining the ratio between the gray level of the highest gray level pixel and the gray level of the lowest gray level pixel.

15. A method according to claim 14 wherein the number of bits used for representing the gray level of each pixel in each high spatial resolution sub-array is smaller than the number of bits used for representing the gray level of each pixel of the input image.

16. A method according to claim 14 wherein the gray level of each pixel in each high spatial resolution sub-array is represented by one bit.

17. A method according to claim 14 wherein one gray level is assigned to each low spatial resolution sub-array.

18. A method according to claim 1 wherein the number of bits used for representing the gray level of each pixel in each high spatial resolution sub-array is smaller than the number of bits used for representing the gray level of each pixel of the input image.

19. A method according to claim 18 wherein the gray level of each pixel in each high spatial resolution sub-array is represented by one bit.

20. A method according to claim 18 wherein one gray level is assigned to each low spatial resolution sub-array.

21. A method according to claim 1 wherein the gray level of each pixel in each high spatial resolution sub-array is represented by one bit.

22. A method according to claim 21 wherein generating the high spatial resolution sub-array comprises comparing the given sub-array to a predetermined threshold matrix, including a threshold element for each pixel in the given sub-array, and assigning a first gray level to each pixel having a gray level lower than that of the corresponding threshold element and a second gray level to each pixel having a gray level higher than that of the corresponding threshold element.

23. A method according to claim 22 wherein one gray level is assigned to each low spatial resolution sub-array.

24. A method according to claim 21 wherein one gray level is assigned to each low spatial resolution sub-array.

25. A method according to claim 1 wherein one gray level is assigned to each low spatial resolution sub-array.

26. A method according to claim 25 wherein the gray level of each low spatial resolution sub-array is represented by more than one bit.

27. A method according to claim 26 wherein the gray level of each low spatial resolution sub-array is represented by a seven-bit-string.

28. A method according to claim 1 and further comprising combining said high resolution and low resolution sub-arrays to form a compressed digital image.

29. A method according to claim 28 and further comprising decompressing the compressed digital image to a form suitable for image reproduction.

30. A method according to claim 29 and further comprising reproducing a physical Image corresponding to the compressed digital image.

31. A method according to claim 30 wherein decompressing the compressed image comprises "on the fly" decompression.

32. A method according to claim 30 wherein reproducing a physical image comprises printing an image corresponding to the digital image.

33. A method according to claim 30 wherein reproducing a physical image comprises displaying an image corresponding to the digital image.

34. A method according to claim 1 wherein the low spatial resolution sub-array is not in half tone form.

35. A method according to claim 1 wherein the high spatial resolution sub-array is not in bit-mapped form.

36. A method according to claim 1 wherein one gray level is assigned to each low spatial resolution sub-array.

37. A method according to claim 36 wherein the gray level of each low spatial resolution sub-array is represented by more than one bit.

38. A method according to claim 37 wherein the gray level of each low spatial resolution sub-array is represented by a seven-bit-string.

39. An image processing method comprising:
providing a digital, continuous-tone, input image represented by an array of pixels, the array having a predetermined pixel resolution and each pixel of said array having one of a predetermined number of available gray levels;
dividing the array of pixels into a plurality of sub-arrays of pixels;
operating on each sub-array with an edge detector and dividing the sub-arrays into those determined to contain an edge and those determined not to have an edge by the edge;
if the sub-array is determined to contain an edge, generating a high spatial resolution output image sub-array of pixels corresponding to the given sub-array, each of said pixels having one of a first number of gray levels, said first number being smaller than the predetermined number of gray levels of the input image;
if the sub-array is determined not to contain an edge, generating a low spatial resolution output image sub-array of pixels corresponding to the given subarray, each of said pixels having a second number of gray levels; said low spatial resolution being smaller than the predetermined pixel resolution of the input image; and
forming a half tone version of at least the low spatial resolution sub-arrays.

40. A method according to claim 39 wherein providing the digital input image comprises converting a given, unsuitable, pixel resolution into the predetermined pixel resolution.

41. A method according to claim 39 wherein the number of bits used for representing the gray level of each pixel in each high spatial resolution sub-array is smaller than the number of bits used for representing the gray level of each pixel of the input image.

42. A method according to claim 39 wherein the gray level of each pixel in each high spatial resolution sub-array is represented by one bit.

43. A method according to claim 39 and further comprising combining said high spatial resolution and low spatial resolution sub-arrays to form a compressed digital image.

44. A method according to claim 43 and further comprising decompressing the compressed digital image to a form suitable for image reproduction.

45. A method according to claim 44 and further comprising reproducing a physical image corresponding to the compressed digital image.

46. A method according to claim 45 wherein decompressing the compressed image comprises "on the fly" decompression.

47. A method according to claim 45 wherein reproducing a physical image comprises printing an image corresponding to the digital image.

48. An image processing method comprising:
providing a digital, continuous-tone, input image represented by an array of pixels, the array having a predetermined pixel resolution and each pixel of said array having one of a predetermined number of available gray levels;
dividing the array of pixels into a plurality of sub-arrays of pixels;
determining, within each sub-array, a gray level contrast for each of the sub-arrays;
if the gray level contrast of a given sub-array exceeds a preselected threshold, generating a high spatial resolution output image sub-array of pixels corresponding to the given sub-array, each of said pixels having one of a first number of gray levels, said first number being smaller than the predetermined number of gray levels of the input image; and
if the gray level contrast of the given sub-array is below the preselected threshold, generating a low spatial resolution output image sub-array of pixels corresponding to the given sub-array, each of said pixels having a second number of gray levels; said low spatial resolution being smaller than the predetermined pixel resolution of the input image,
wherein one gray level is assigned to each pixel of each each low spatial resolution sub-array.

49. A method according to claim 48 wherein the gray level of each low spatial resolution sub-array is represented by more than one bit.

50. A method according to claim 49 wherein the gray level of each low spatial resolution sub-array is represented by a seven-bit-string.

51. A method according to claim 50 and including half toning of at least the low spatial resolution sub-arrays.

52. An image processing method comprising:

provided a digital, continuous-tone, input image represented by an array of pixels, the array having a predetermined pixel resolution and each pixel of said array having one of a predetermined number of available gray levels;

dividing the array of pixels into a plurality of sub-arrays of pixels;

determining, within each sub-array, a gray level contrast for each of the sub-arrays;

if the gray level contrast of a given sub-array exceeds a preselected threshold, generating a high spatial resolution output image sub-array of pixels corresponding to the given sub-array, each of said pixels having one of a first number of gray levels, said first number being smaller than the predetermined number of gray levels of the input image;

if the gray level contrast of the given sub-array is below the preselected threshold, generating a low spatial resolution output image subarray of pixels corresponding to the given subarray, each of said pixels having a second number of gray levels; said low spatial resolution being smaller than the predetermined pixel resolution of the input image;

and forming a half tone version of at least the low spatial resolution sub-arrays, wherein the pixels of at least the low spatial resolution sub-array image have a number of gray levels determined by more than one bit per pixel.

* * * * *